S. M. BOWER.
TRACTION WHEEL.
APPLICATION FILED JUNE 6, 1910.
983,023.
Patented Jan. 31, 1911.
3 SHEETS—SHEET 1.
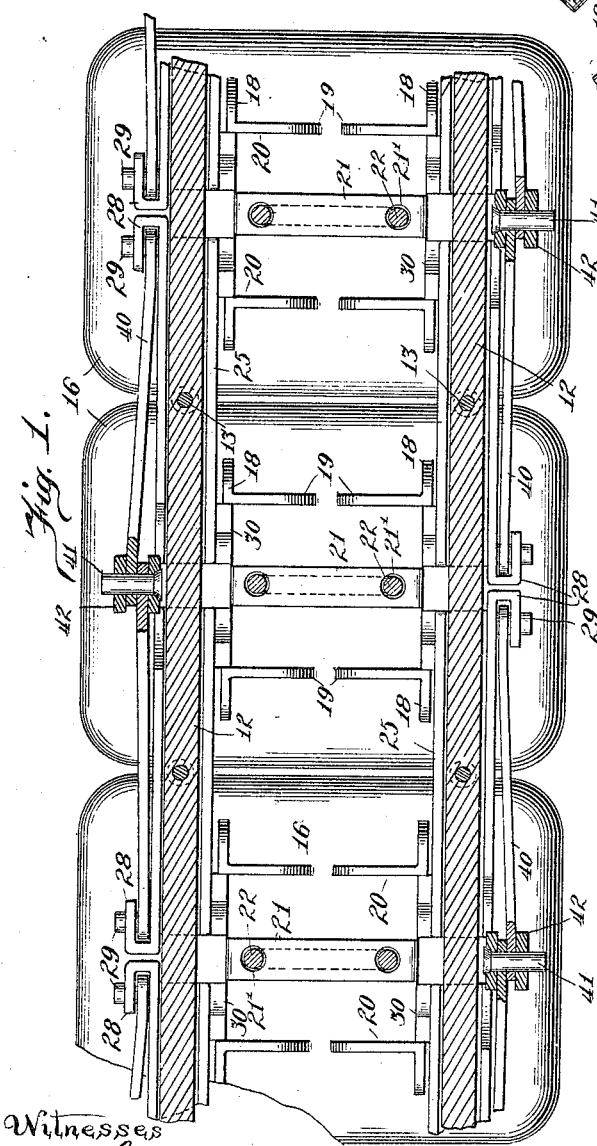
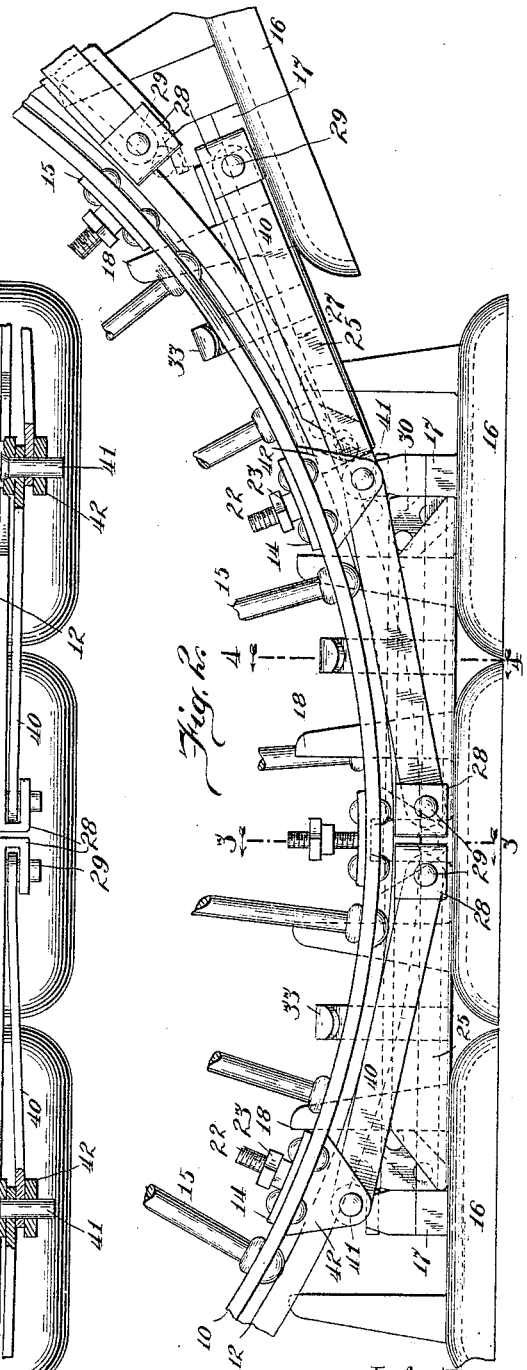
Witnesses
Inventor
Samuel M. Bower.

S. M. BOWER.
TRACTION WHEEL.
APPLICATION FILED JUNE 6, 1910.

983,023.

Patented Jan. 31, 1911.
3 SHEETS—SHEET 2.

Witnesses
Milton Lenoir
W Linn Allen

Inventor
Samuel M. Bower.
by Forée Bain and May
Attorneys.

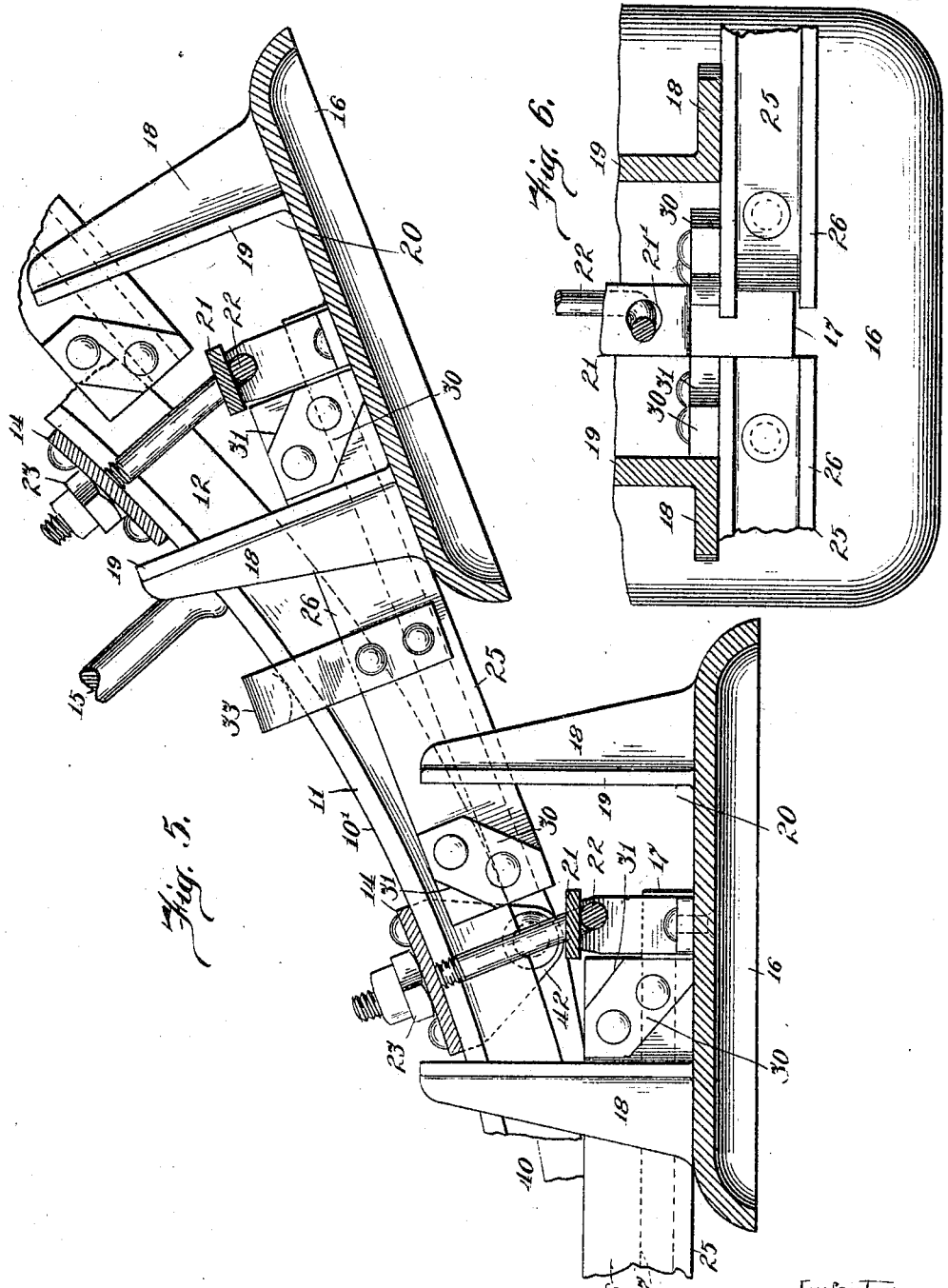

UNITED STATES PATENT OFFICE.

SAMUEL M. BOWER, OF CHICAGO, ILLINOIS.

TRACTION-WHEEL.

983,023.

Specification of Letters Patent.   Patented Jan. 31, 1911.

Application filed June 6, 1910.   Serial No. 565,246.

*To all whom it may concern:*

Be it known that I, SAMUEL M. BOWER, a citizen of the United States, residing at Chicago, in the county of Cook and State of Illinois, have invented certain new and useful Improvements in Traction-Wheels, of which the following is a specification.

My invention relates to improvements in traction wheels and more particularly to traction wheels comprising tread feet mounted upon a rim in conjunction with bridge members, interposed between the feet and rim, to carry the weight applied to the rim from foot to foot as the feet are successively emplaced upon the ground.

Many advantages are attained in structures embodying my invention, as will be apparent to those skilled in the art from the following description of a practical embodiment of the invention, but among the special objects of the invention are to provide novel interrelations and connections between the elements of the wheel which are simple, and highly efficient, and which enhance the practicability of structures of the general character described.

Figure 3:
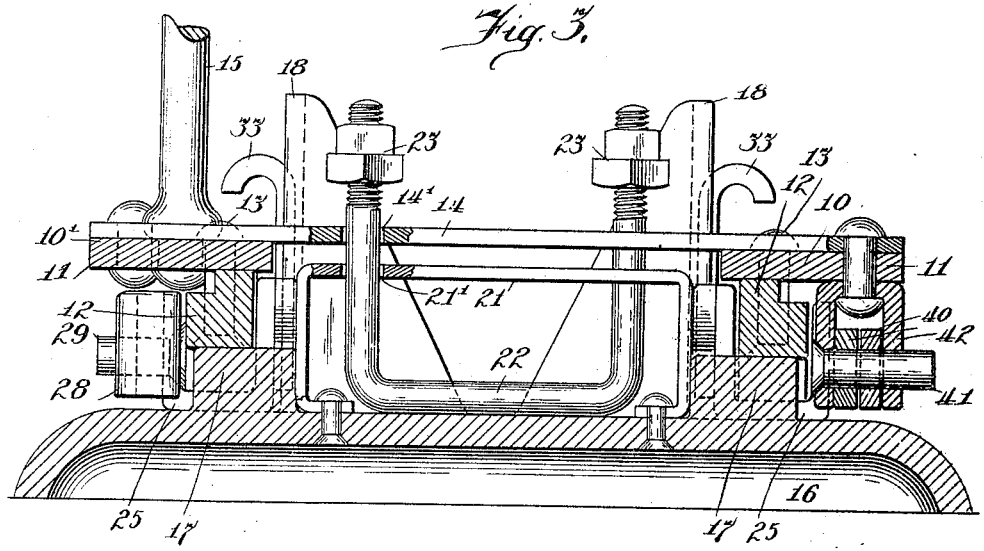
Figure 4:
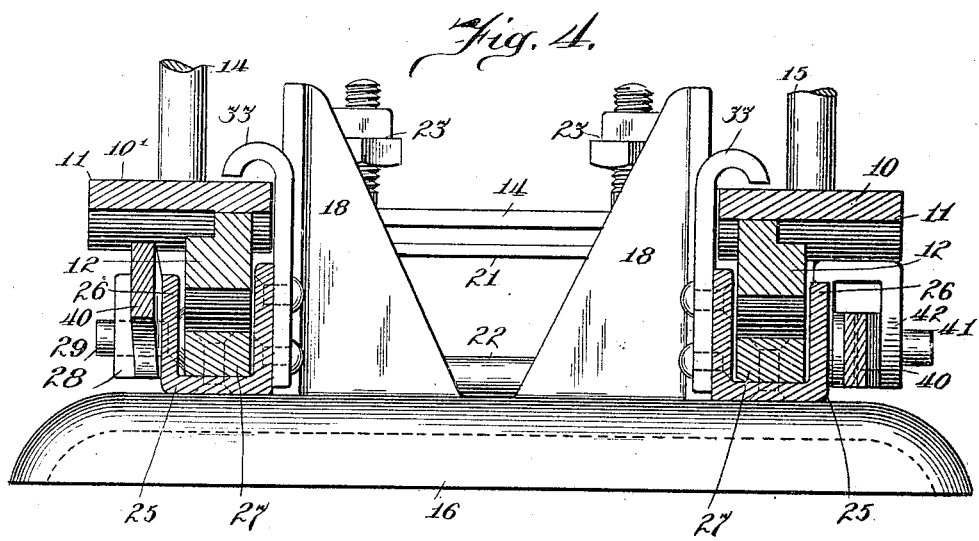

In the drawings, Figure 1 is a plan development with parts in section, showing the relation between a few feet and the rim structure; Fig. 2 is a side elevation of a fragment of a wheel, embodying my invention; Fig. 3 is a transverse section on line 3—3 of Fig. 2; Fig. 4 is a transverse section on line 4—4 of Fig. 2; Fig. 5 is an enlarged transverse section of a fragment of the rim, showing two of the feet; and Fig. 6 is an enlarged plan detail with parts in section of fragments of a foot and bridge.

In the drawings, 10—10' indicate, in general, two parallel rim annuli, forming members of a skeleton rim, each such annulus, in the specific form shown, comprising a flat rim band, 11, and a narrower tread ring, 12, secured to the band near the inner edge of the latter as by rivets, 13. The annuli, 10—10', are cross-connected by straps, 14, preferably on the transverse lines of the foot centers. The spokes, 15, are suitably secured to the rim annuli, 10—10', and, of course, converge to a suitable hub, not shown.

16 indicates, in general, each foot, of suitable dished shape in bottom presentation, each foot being provided on its upper surface with a pair of short central bosses, 17, to receive the tread rings, 12—12, when the weight of the wheel is directly imposed upon the foot, and being provided further with parallel longitudinal guide members, 18, preferably braces by transverse webs, 19, and arranged to pass just inside of the separated rim annuli of the skeleton rim, to prevent turning of the feet on the rim or lateral displacement of the feet relative to the rim.

To accommodate the straps, 14, the guide members, 18, are separated or spaced, as at 20, and each foot may be loosely connected with the corresponding strap, 14, to limit the outward movement of the foot from the rim. To this end, I provide a transverse yoke, 21, connected to the foot centrally of its length, spanning the space between the guides, 18, and paralleling the foot, said yokes being apertured, as at 21', in register with similar apertures, 14', in the straps, 14, to receive a U-bolt, 22, which carries on its protruding end suitable adjusting nuts, 23, to limit the movement of the U-bolt relative to the strap, 14, while the base of the bolt limits the outward movement of the foot-yoke.

For spanning the spaces between the central bearing lugs 17—17 of adjacent feet, and carrying the weight of the rim from foot to foot, and aiding in communicating the traction strain from the rim to the feet. I provide bridge members, 25, for interposition between the feet and rim. Each bridge member, in the specific construction shown, is a channel bar, 26, having its base or bottom portion of thickness equal to the height of the lugs, 17. Specifically, I prefer to provide such a construction by employing commercial channel bars, and placing in the bottom of the channel a shoe, 27, to give requisite thickness to the base structure. Each bridge member 25 is of length to span the space between and substantially abut against the bosses, 17, of contiguous feet when the latter are emplaced in longitudinal alinement in substantial contact with each other, and each bridge is preferably so constructed that, when so disposed horizontally on two contiguous emplaced feet, it effects a lock with each foot to prevent fore-and-aft movement between the parts to any substantial degree. To this end, I provide upon the exterior of each bridge member, upon the inner side thereof, that is to say, the side nearest the center line of the wheel, a locking block, 30, providing, at its longitudinal ends, shoulders for substantial abutment respectively against the guide, 18, and the yokes, 21, of the foot, the appropriate corners of the locking blocks being chambered off, as at 31, to permit of the functional movements of the bridge. Contact of the block 30 with the yoke 21 is not essential, as the end abutment of the bridge against the lug 17 suffices for the locking purposes, but the specific arrangement described is advantageous for the guiding relation between parts 21 and 30.

Each bridge may be restrained against undue outward movement relative to the rim by a hook, 33, secured to its inner exterior surface about the middle of its length and extending up and over the rim band, 11, in suitable fashion to limit the outward movement of the bridge from the rim to that which its function requires.

To communicate traction strain from the rim to the bridges, I effect link connection between each bridge and the rim, and it will be particularly noted that the connection which I employ is such that practically no relative sliding or lost motion of the jointed parts is required. Specifically, 40—40 indicate links, each of effective length substantially equal to the base-length of the bridge members, at one end connected to the end of a bridge member as close to the extremity thereof as practice will permit and each link at its other end pivotally connected with the rim adjacent the free remote end of the bridge, or, otherwise stated, in alinement with the adjoining foot center. Specifically, each link, 40, has one end articulated for pivotal movement only with the bridge, the outer side rail of the bridge being preferably bent outwardly into U-form to provide loop 28, to support at both ends a pivot, 29, receiving one extremity of the link 40, and the opposite extremity of the link 40 being pivoted as at 41 in a bracket, 42, riveted to the overhanging portion of the rim band, 11. In the specific construction shown, the arrangement is such that such a bracket, 42, is provided only in register with the center of every second foot, two oppositely extending links 40 being pivotally supported by each bracket, and correspondingly the contiguous ends of each pair of adjacent bridges being either both articulated or both free, such construction making for cheapness and facility in manufacture of the devices. That the length of the link 40 between centers may approximate the base length of the bridge, the centers are located somewhat beyond the outer surface of tread ring 12 of the rim.

In operation, it will be apparent that when two foot members are emplaced in end-to-end alinement, both in contact with the ground, and with the wheel weight on the bridge, said bridge member, spanning the space between the emplaced feet, locks both of the latter against relative movement, through its end bearing against lugs 17—17, and the locking connection of its parts, 30—30, with the rigid guides, 18—18, of the feet, the shoe 27 within the bridge affording a bearing surface on which the tread ring, 12, of the rim may roll from foot to foot. The arrangement of the pivotal centers of the link 40 at a radial distance from the center of the wheel slightly greater than the radius of the rim rings, 12, makes each link of a length substantially equal to the travel of the rim between the radial line of the link centers, so that substantially no lost motion need be provided in the connections of the links at either end to enable them to accommodate themselves to the motions of the bridge members occasioned by the rocking of the feet and the progress of the rim. As the foot rises from the ground, as shown in Fig. 5, the bridge is carried upward, its position being determined partly by the hook, 33, and partly by the position of the connected link and the contiguous lifted foot. But it will be obvious that under all conditions the interconnected parts will stand ready to resume their operative relations as the feet are successively called into play to support the rim.

While I have herein described in some detail a particular embodiment of my invention for purposes of full disclosure, and some details of which I may hereafter claim for their special benefits, it will be apparent to those skilled in the art that numerous changes in the details of construction might be made without departure from the spirit of my invention and within the scope of the appended claims.

What I claim is:

1. In a traction wheel, a rim structure, tread feet therefor, bridge members interposed between the rim and feet for spanning adjacent feet, and links, each substantially as long as a bridge member, each articulated for pivotal motion alone at one end with a contiguous bridge member and at its opposite extremity with the rim.

2. In a traction wheel, the combination of a rim structure, tread feet therefor, bridges arranged between the feet and rim to span adjacent feet, from points near the mid portion of said feet respectively, links substantially as long as said bridges, each articulated for pivotal movement only at one extremity at the end of the bridge member, and at the other extremity to a point upon the rim substantially centrally over the foot with which the opposite end of the bridge member coacts.

3. In a traction wheel, the combination of a rim structure, tread feet therefor, bridges for spanning adjacent feet, arranged for engagement with said feet to communicate traction strain thereto, and means for communicating traction strain from the rim to the bridges for communication thereby to the feet, comprising links, each articulated at one end with the bridge at a substantial distance from the bridge center, and at the other end articulated with the rim at a substantial distance to the opposite side of the bridge center.

4. In a traction wheel, the combination of a rim structure tread feet therefor, bridges spanning adjacent feet, arranged for engagement with said feet to transmit traction strain thereto, and means for communicating traction strain from the rim to the bridges for communication thereby to the feet, comprising links, each of a length approximating the length of a bridge, at one end connected for pivotal movement only with the contiguous extremity of the bridges and, at its other opposite end, similarly connected with the rim at a point substantially centrally above the foot with which the opposite end of the bridge coacts.

5. In a traction wheel, the combination of a rim structure, tread feet therefor, bridges for spanning between adjacent feet when the latter are emplaced on the supporting surface, arranged for locking engagement with the foot to hold the latter against displacement in either direction, and means for communicating traction strain to the bridges for communication thereby to the feet, comprising links, each pivotally connected at one end with one end of the bridge, and at its opposite end similarly connected with the rim at a point above the opposite end of the bridge.

6. In a traction wheel, a skeleton rim comprising parallel annuli, tread feet providing radial guides extending between and guided by said annuli, bridges for spanning contiguous feet, links connecting the bridges and rims, for communicating traction strain from the rims to the bridges, and locking connections between the bridges and feet for locking each bridge when emplaced against longitudinal displacement upon said feet.

7. In a traction wheel, the combination with a rim structure providing parallel annuli, tread feet connected at intervals around said rim structure, pairs of bridges located between the rim and feet, each pair spanning the spaces between two adjacent feet, each bridge comprising a channel iron for receiving the tread portion of the appropriate annulus, in its passage from foot to foot, rim-receiving bosses upon the feet between and in alinement with said bridge members for thrust engagement with the latter, and links, each pivoted at one end to a bridge-extremity and at the other end to the rim above the free extremity of said bridge.

8. In a traction wheel, the combination with a rim structure providing a bearing surface, tread feet connected to the rim structure, bridges spanning spaces between adjacent feet for transmitting pressure from the rim to the feet, rim-receiving bosses upon the feet between and in alinement with said bridges for thrust engagement with the latter, links communicating traction strain from the rim to the bridges, each secured for pivotal movement between a bridge-end and the rim at a point above the free end of said bridge, and link supporting means on the rim in register with every other foot about said rim structure for permitting such pivotal movement of the links of two adjacent bridges.

9. In a traction wheel, the combination with a rim structure, feet, and bridges interposed between the feet and rim, and links pivoted each at one end to a bridge-extremity and at its other end to the rim alining radially with the free extremity of the bridge, the pivotal centers of the links being at a greater radial distance from the wheel center than the tread of the rim.

In testimony whereof I hereunto set my hand in the presence of two witnesses.

SAMUEL M. BOWER.

In the presence of—
W. LINN ALLEN,
MARY F. ALLEN.